Oct. 8, 1946. C. T. LUDINGTON ET AL 2,408,788
AIRFOIL
Filed June 16, 1939 3 Sheets-Sheet 1
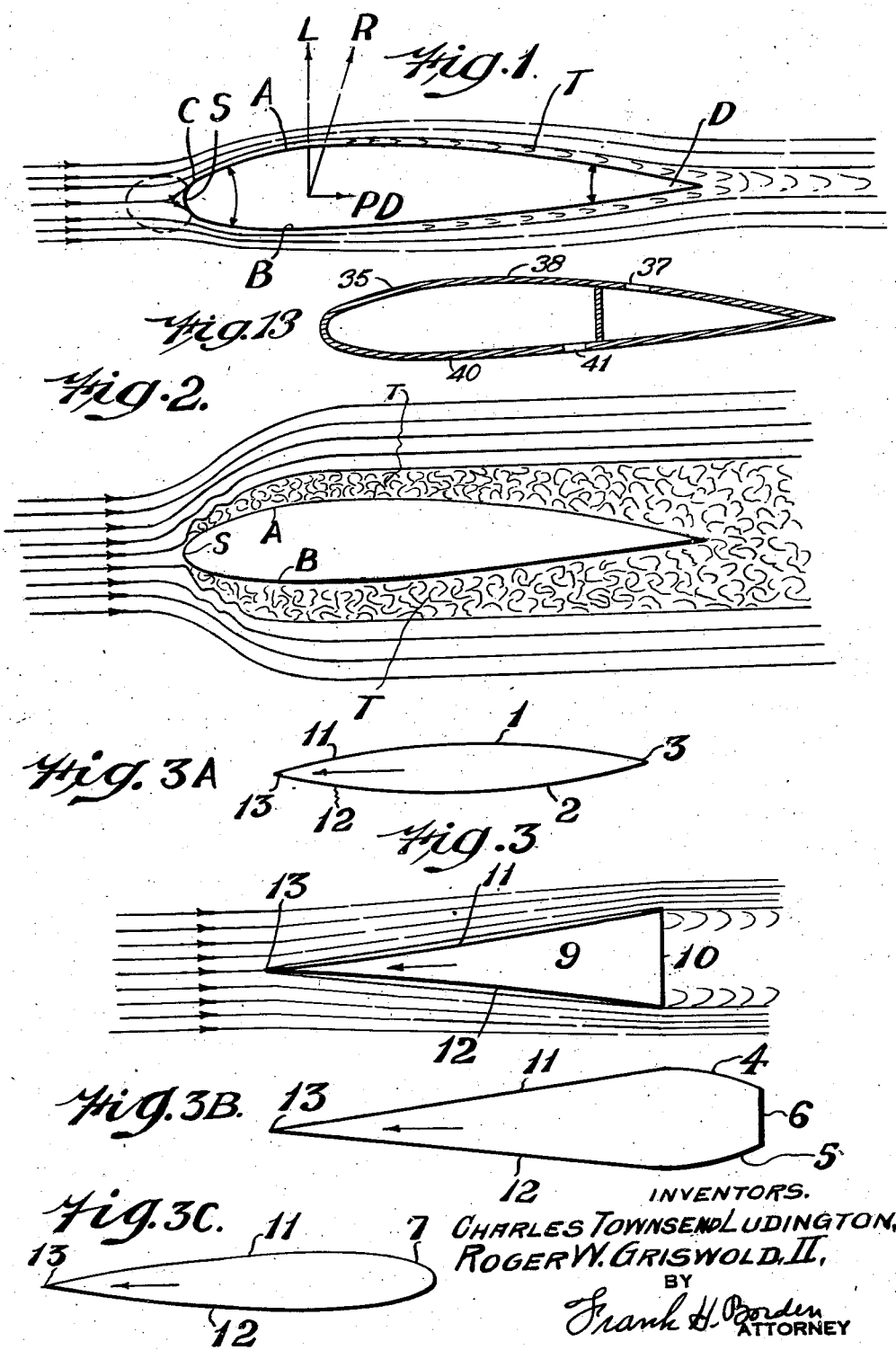

Oct. 8, 1946.　　C. T. LUDINGTON ET AL　　2,408,788
AIRFOIL
Filed June 16, 1939　　3 Sheets-Sheet 2
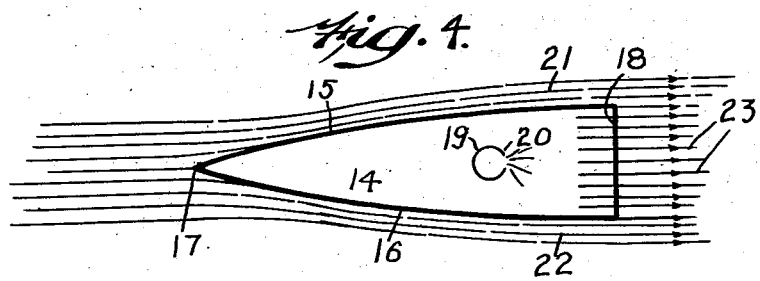
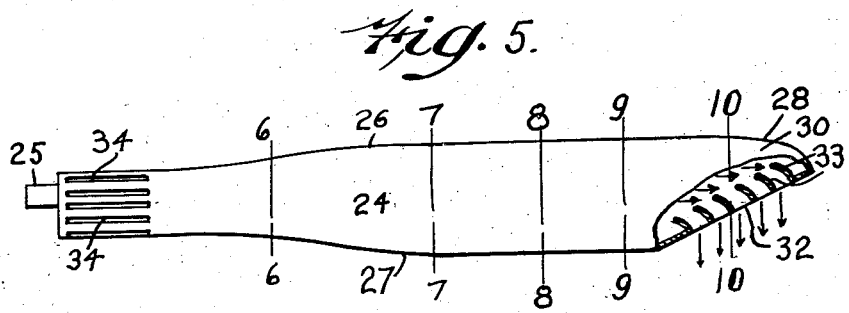
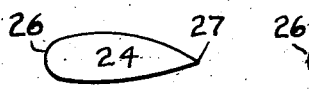 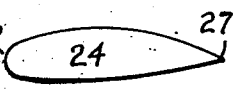 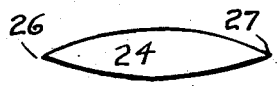
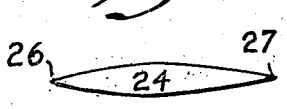  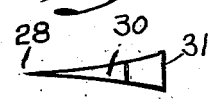
INVENTORS.
CHARLES TOWNSEND LUDINGTON,
ROGER W. GRISWOLD, II.
BY
Frank H. Borden
ATTORNEY Oct. 8, 1946.  C. T. LUDINGTON ET AL  2,408,788
AIRFOIL
Filed June 16, 1939  3 Sheets-Sheet 3
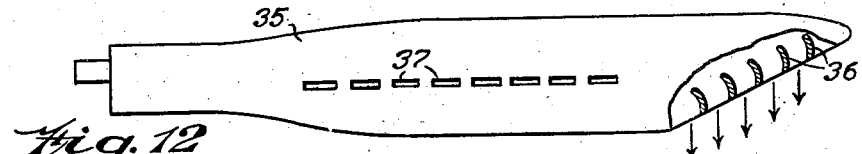
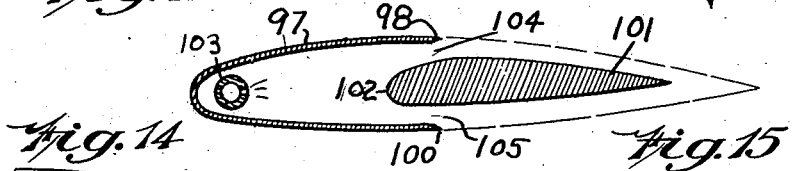
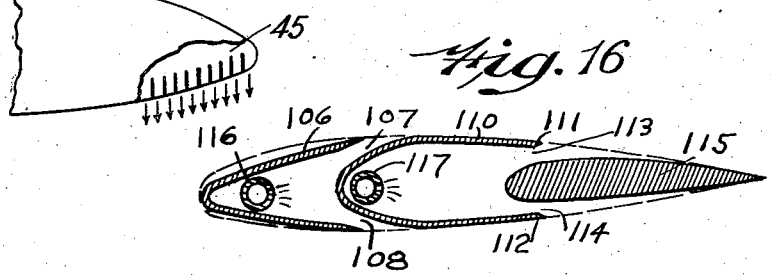
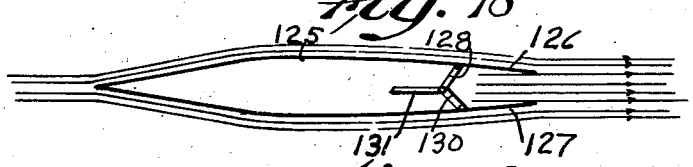
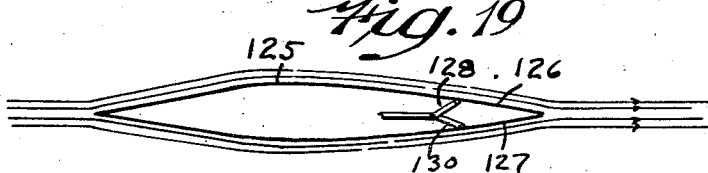
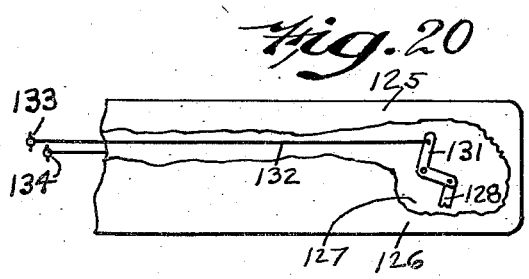
INVENTORS.
CHARLES TOWNSEND LUDINGTON
ROGER W. GRISWOLD. II.
BY
Frank H Borden
ATTORNEY Patented Oct. 8, 1946

2,408,788

UNITED STATES PATENT OFFICE 2,408,788

AIRFOIL

Charles Townsend Ludington, Ardmore, Pa., and Roger W. Griswold, II, Old Lyme, Conn.

Application June 16, 1939, Serial No. 279,416

1 Claim. (Cl. 170—172)

This invention relates to airfoils and particularly to the provision of rotatable airfoils by which fluid flow control relative to the airfoils is established for the normal high speed ranges including the super-sonic.

Airfoils, whether of the fixed or rotary wing type, are essentially dynamic energy converters, the principal function of which is to produce the optimum ratios of lift to drag in the normal operating range. Due to certain functional faults inherent with airfoils of the prior art, the conventional type are seriously restricted in their range of usefulness by definite upper and lower velocity limits, both critical, such upper limit of most so-called modern sections occurring at approximately three quarters the speed of sound. The critical lower limit is of course, the "stall." This invention is mainly concerned with the high speed characteristics of airfoils, and herewith discloses principles of super-sonic flow control (self-energized in the case of rotatively operative airfoils), which are believed to be new. These principles, as will be apparent to those skilled in the art as the description unfolds, combine in a novel manner, proven and well established aerodynamic laws, thus, for what is believed to be for the first time, enabling operation of airfoils constructed according to the principles of the invention, well into the range of super-sonic velocities, with efficiency and economy. While this disclosure reveals means to utilize the available centrifugal energy of rotating airfoils, it must also be clearly understood that the same basic principles of super-sonic flow control are equally applicable to fixed wing aircraft when other sources of energy are introduced.

In the following description, the term "rotor" is used to cover all applications of airfoils where translation is combined with rotation, either normal to, or in the plane of rotation, or any combination of the two, as with autogiros, helicopters, gyroplanes etc., sometimes called direct lift aircraft since the primary function of rotors is the generation of lift, and secondarily thrust in some cases, while the term "propeller" applies to all airfoil propulsive systems where translation is combined with rotation substantially normal to the plane of rotation to provide thrust primarily. The invention applies primarily to both rotors and propellers.

*Leading edge flow phenomena in the high speed range*

As research on the compressibility burble is rather incomplete, so far as known, and consequent knowledge of the phenomena is thus inconclusive, the following exposition is believed to be accurate within the limits of presently understood physical concepts and their attendant terminology. While the method of expression used in the following discussion may be subject to later revision, it is submitted that the underlying principles and basic hypotheses will remain valid.

Though the several design parameters may vary considerably, conventional airfoils have in common a rather blunt or bulbous nose leading edge, the curved surfaces of which diverge through a wide angular range to the point of maximum airfoil thickness and then more gently converge to join into a fairly sharp trailing edge. In the high speed range (relatively low angle of attack) such airfoils divide the flow at some point on the leading edge known as the stagnation point—so-called, since the full impact of the free stream flow impinges and is substantially stopped in its path of travel at this theoretical point (changing with changes in the angle of attack) with consequent conversion of its dynamic (or kinetic energy) pressure to a corresponding increase of static pressure at the leading edge. Extending either side of the stagnation point over a considerable section of the bulbous nose and moderately forward of the airfoil is a general region of stagnation wherein the flow is decelerated progressively less, the net result of the phenomena being the creation of a substantial pressural drag throughout the stagnation region. Pressural drag is the resultant down stream or rearward component of the normal pressures on the surfaces and varies with different shapes and velocities. Being an inescapable by-product of the shape-velocity factor it represents the irreducible minimum to which drag might theoretically be reduced if frictional or viscous drag were eliminated. In the normal cruising range of present day fixed wing aircraft, pressural drag is an important, though not by any means a major part of wing drag, but towards the sonic range of velocity, as attained over the tip sections of propellers and rotors it becomes a controlling factor—and the preponderant part of pressural drag under the latter conditions builds up within the stagnation region at the relatively blunt leading edge. Thus the shape of the latter is of paramount importance for high speed.

The stagnation area or region is substantially an effective function of the bulbousity or relative thickness of the entering edge and can be substantially eliminated as the bulbousity disappears and as the thickness of the entering edge becomes reduced.

Under the combined influence of the excess static pressure in the stagnation region, which must of necessity be re-converted to kinetic energy, and the crowding of the streamlines with consequent flow convergence, caused by the widely diverging surfaces of conventional leading edge sections, a substantial acceleration is imparted to the flow over this part of the airfoil. The shape of the leading edge (generally referred to as the camber) determines what might be called the leading edge acceleration ratios. For the average conventional airfoil in the high speed range the acceleration ratio is such as to give an increase in velocity of about one and one half times that of the undisturbed free stream flow. Quite obviously, then, sonic or super-sonic velocities will be attained in this region when the speed of such an airfoil itself is somewhat less than that of sound, say of perhaps about 550 M. P. H., approximately characterized as sub-sonic and which may be designated as the critical compressibility speed. The critical speed, of course, varies with different airfoil profiles. Here again, the leading edge camber is of vital importance for sonic or super-sonic speed with economy.

While excessive pressural drags and acceleration ratios are important contributory causes of presently encountered subsonic speed limitations inherent in the prior art, so far as understood, by far the most serious and controlling consideration is the flow deflection factor. According to this theory a line drawn tangent to the leading edge at the stagnation point is approximately normal to the direction of the undisturbed free stream flow in the high speed range, which means there is an equivalent extreme angular displacement of the flow at this point, the deflection being successively less with increasing distance from the stagnation point. The flow having divided and been sharply deflected into new paths of travel from which the leading edge surfaces increasingly diverse (curving away from deflected flow), it is known from Newton's law that it will continue in its state of uniform motion in a straight line unless it is compelled by external forces to change that state. Fortunately for conventional airfoils in the sub-sonic range below the critical compressibility speed (up to about 550 M. P. H.) such an external force of sufficient magnitude is had in the available static pressure of the atmosphere—for again, according to Newton's law, change of momentum is proportional to impressed force and takes place in the direction in which the force acts. Thus the impressed force of the atmosphere acting normally to the surface constrains and redirects the flow along the surface in the acceleration regions, but is unbalanced in proportion to the kinetic energy of the flow, thus setting up an equivalent low pressure at the surface—in the stagnation region the impressed atmospheric force is augmented by the excess static pressure, dynamically induced and a compressibility burble in this region would accordingly be a physical impossibility. When however, the flow velocity over any part of the airfoil attains the speed of sound, its dynamic pressure reaches a critical value relative to the static pressure of the atmosphere (i. e. when the dynamic pressure is approximately 53% of atmospheric pressure) and we have seen that such local flow velocities will be attained with the average airfoil of the prior art at a speed of about 550 M. P. H. When such critical velocity-pressure relationships are reached the normal stability of the flow breaks down resulting in a highly disorganized surging generation of turbulence in proximity to the stagnation region. This phenomenon is known as the compressibility burble. The resultant highly disorganized flow is chiefly characterized by a phenomenal increase of drag, and a very dynamically unstable pressure distribution over the airfoil.

Even though one might overlook the deleterious effects of the severe loss in lift-drag efficiency, which could not be justified for any practical application, a moment's consideration of the degree of dynamic instability induced by this condition will make it apparent that it is very dangerous to use conventional airfoils in the super-sonic range. Since a large proportion of the unbalanced load on the airfoil is concentrated in the stagnation region at the leading edge due to the extreme pressural drag and since the stagnation region itself is teetering on a point, so to speak (it could hardly be otherwise with such turbulent flow to the rear), we have here the very combination of forces to set up resonant vibration in the structure, or aerodynamic flutter, the disastrous consequences of which are only too well known to the art. Quite clearly, such a complete break-down of functional characteristics (lift, drag and favorable (stable) pressure distribution), utterly destroys the airfoil's usefulness and the best that may be said is that the phenomenon is highly extravagant of energy, most of which is dissipated as heat, some as sound.

*The entering wedge airfoil*

It should now be obvious, as our studies and experiments have led us to conclude, that an approach to the elimination of the compressibility burble or its relegation to some higher supersonic velocity, must be initiated by a radical redesign of the conventional airfoil leading edge parameters with which this highly undesirable phenomenon is inherently functional. Namely, we must do away with the bulbous nose section and the highly divergent surfaces curved away from the flow. We propose, then, to construct the super-sonic airfoil in the general shape of a wedge, the relatively sharp edge of which is the airfoil leading edge. This will, of necessity, reduce the stagnation region literally to a point or line, with corresponding reduction of pressural drag—for all practical purposes one might consider the stagnation point to have been eliminated. The surfaces diverge from the leading edge at a relatively small angle and are inclined towards the flow substantially over their whole extent—they may actually be flat, slightly convex or even slightly concavely curved into the flow in the manner of a hollow ground razor or in any combination of the three basic surfaces just recited. Such an airfoil will reduce flow deflection from that caused by a plane normal to the flow, as functionally induced by the bulbous nose, to one inclined at a very small acute angle, and thus the most serious flow disruption factor in the sonic range will have been largely eliminated, in fact, this combination of surfaces and factors now serves to promote flow control, as will presently appear.

Moderately diverging surfaces will cause correspondingly little flow convergence, with consequent low acceleration ratios extending over the entire airfoil. Accelerating flows induce a falling pressure gradient along the surface, having characteristic laminar flow stability and extremely small frictional or viscous drag. Since the surfaces are inclined into the flow at every point, there will be a small down stream component of dynamic pressure (pressural drag) all along the surface, additive to that of atmospheric impressed force, to maintain higher pressures outside the boundary layer, exerting a repressive effect on the flow within the boundary layer, which must accordingly remain laminar so long as this circumstance prevails. The limiting factors of the prior art have thus been so radically modified as to achieve completely new functional characteristics in the super-sonic range with an airfoil so constructed, and what formerly precipitated flow disruption is now made to actually facilitate flow control. It is further important to note from the above discussion that in addition to the great reduction of pressural drag, it is more evenly distributed over the whole surface of the entering wedge airfoil, which factor, combined with the laminar flow stability, provides good dynamic stability. Since no conceivable shape of convergent ordinary airfoil surfaces terminating in the usual type of trailing edge would induce the flow to follow such surfaces in the super-sonic range, due to insufficient atmospheric impressed force, it is generally quite useless to so terminate the entering wedge airfoil and for super-sonic speeds it may as well therefore remain a simple wedge shape having a blunt trailing edge, the face of which is substantially normal to the undisturbed free stream flow. Such an airfoil will, of course, have a large momentum loss wake but nowhere near that of the conventional airfoil at super-sonic velocities and it will therefore effect a great saving in drag. This is useable of itself but in order to reduce or even eliminate this momentum loss drag we propose to combine with the entering wedge airfoil and in some cases even with bulbous nosed airfoils and the like a system of:

*Fluid disposal energy balance*

By dispensing with the conventional after-body convergent surfaces and substituting therefore a fluid discharge having substantially the same kinetic energy and direction of flow as the adjacent local stream when it leaves the trailing edges of the wedge airfoil, a harmonious lamination of such airfoil-ejected-flow with the free streamlines may be obtained.

It may be considered that with the entering wedge airfoil described or with any other entering edge as will be disclosed, with the trailing edge thereof comprising a relatively blunt end from which a fluid propulsion is effected of the proper thickness and with its speed as close as possible to that of the relative air stream at such discharge points as to have practically no relative motion with regard to such air stream, in effect creates a synthetic chordwise elongation of the airfoil having no effective frictional or other turbulence-creating character. The slightly higher momentum energy of the wake of such an airfoil system relative to the undisturbed free stream kinetic energy will readily re-establish atmospheric equilibrium without undue disturbance very shortly after passing of the airfoil. The significance of providing means to fully maintain laminar flow over the entire airfoil and to eliminate the turbulent wake in operating Reynolds numbers (velocity-airfoil size factors) will be appreciated when it is realized that it effects a reduction in viscous drag to about one-sixth that attained by the prior art which efficiency increases with higher Reynolds numbers. The introduction of fluid discharge energy jets into the flow may also permit a slight curvature of the surfaces away from the flow, if that be desirable for any reason.

In the case of rotors and propellers, such fluid flow may be provided by the introduction of inlet openings disposed along the blades, preferably near or at the hub, connected by communicating passages within the blade to rearwardly directed discharge jets disposed in the region of the blade tip. The centrifugal force due to blade rotation will accordingly set up corresponding pressure differentials between the inlet passages and the discharge jets, thus inducing a flow into the former, radially through the blade and rearwardly ejected out through the latter (properly directed to the rear by deflector vanes) in the manner of any conventional type centrifugal blower—unrestricted discharge gives a complete conversion of centrifugal force to kinetic energy, except for frictional losses in the system. It will be observed that the proposed centrifuge flow system is automatic in its operation since it utilizes the available rotational energy which thus eliminates the need for external sources of energy and their necessary power converters, such as blowers etc., with their attendant complications. With correct application of the principles herewith disclosed, our calculations indicate sufficient centrifugal energy is available in present operating ranges of propellers and rotors to achieve the desired results. Since both centrifugal force and dynamic pressure are a function of velocity squared—the system should be designed to substantially balance these forces over the tip sections requiring super-sonic flow control—proper functioning of the system in the case of propellers or rotors will accordingly be independent of velocity, into some, as yet undiscovered, upper limit of the super-sonic range. Obviously, the centrifugally energized fluid flow energy balance principle is susceptible of almost infinite detail modification in the number, size and location of the inlet and discharge passages and the arrangement of the communicating ducts—for instance, if some sacrifice of available centrifugal energy is permissible, the inlet passages may be radially distributed over a considerable span of the blades disposed on either the upper or lower airfoil surfaces, or both, to act as flow control suction slots in removing the turbulent boundary layers over such surfaces. Many other variations could be enumerated but it should be apparent that the scope of the invention encompasses the basic principles as set forth in the foregoing discussion and the appended claims rather than the features of any particular application.

It hardly seems necessary to mention that the energy balance super-sonic airfoil should open up substantial opportunities in several fields of applied aerodynamics, especially with propellers and rotors (such applications might be called centrifuge airfoils) since thrust and lift go up as the square of the rotative speed and the limiting increase in the latter would not be likely to arise from the aerodynamic considerations. Since the fluid ejector tip sections would be operating through laminar flow conditions, the super-sonic region of the blade would actually have far higher efficiency than the inboard sub-sonic areas.

It is among the objects of this invention: to provide improvements in airfoils; to provide an airfoil with which super-sonic speeds can be attained without danger; to provide airfoils for use at speeds approximating that of sound without attainment of a compressibilty burble; to provide improvements in airfoils for use in the super-sonic ranges; to obviate in airfoils certain of the undesirable attributes of the conventional bulbous nosed airfoil at sub-sonic, sonic and super-sonic speed ranges; to provide an airfoil for substantially sonic speeds in which the pressural drag incident to the relative impingement of air upon a stagnation area is effectively eliminated; to provide an airfoil for substantially sonic speeds in which the acceleration of the relative air stream over the leading edge of the airfoil is so reduced as to raise the speed at which a compressibility burble occurs appreciably into the super-sonic; to provide an improved airfoil in which the flow deflection of air flowing relatively past the airfoil leading edge during movement at super-sonic speeds is so reduced or minimized as to be relatively unimportant; to provide an airfoil having a relatively abrupt physical trailing edge with a chordwise synthetic effective trailing edge fluid extension having a minimum coefficient of friction relative to the airflow over the airfoil to minimize the drag otherwise attaching to the abrupt trailing edge; to provide an airfoil for super-sonic speeds in which the energy otherwise effective against a stagnation area is effectively transformed to reduce pressural drag of the airfoil; to provide a novel shape of airfoil; to provide an airfoil applicable to rotor or propeller use with the tip moving in the super-sonic range without creating a shock or compressibility burble wave; to utilize the rotational energy of a rotor or propeller, to provide a gaseous emission creating a synthetic chordwise trailing edge extension of the rotor or propeller airfoil section to reduce the friction between the relatively flowing air stream and the airfoil to minimize the drag of the airfoil; to provide an airfoil with a trailing edge or rearward gaseous emission to reduce drag; to provide a propeller with means such that the tips can travel at super-sonic speeds with safety and efficiency; to provide a variable controlled fluid emission from the trailing edge of a rotor blade the control being consonant with changes in relative velocities resulting from combination of rotational and translational velocities and being either manual or automatically responsive to changes in relative velocities; to provide control means automatically or manually operative to interrupt, or modulate a trailing edge fluid emission in a rotor airfoil or to change the shape of an airfoil comprising a rotor blade to harmonize with or to accommodate the varying relative tip speeds incident to the combination of rotation with translation; to provide an airfoil with movable elements such as to be efficient at low as well as super-sonic flight speeds.

In the accompanying drawings forming part of this description:

Fig. 1 represents a diagrammatic profile of a typical conventional airfoil showing the relative airflow under favorable flight speed conditions, indicating the stagnation region or area, the points or substantial points of greatest acceleration of the airstream, and the lift-drag and resultant for a vector.

Fig. 2 represents a similar diagrammatic profile of the same airfoil after the "shock wave" has formed as an incident of the compressibility burble, showing diagrammatically the great increase of drag.

Fig. 3 represents diagrammatically a profile of an airfoil constructed in accordance with one phase of the invention herein, in which the generally wedge shape is formed of slightly concave upper and lower surfaces with lines indicating the airflow over the airfoil and having an abrupt blunt trailing edge.

Fig. 3A represents diagrammatically a profile of a modification of the airfoil of Fig. 3 having a wedge shaped leading edge formed of convergent flattened arcs, with an elongated trailing edge formed on the same arcs in place of the blunt trailing edge of Fig. 3.

Fig. 3B represents diagrammatically a profile of a modification of the airfoil of Fig. 3, having a truly wedge leading edge formation with planar upper and lower surfaces, with a modified less blunt trailing edge, and in which the airflow would be substantially similar to that of Fig. 3.

Fig. 3C represents diagrammatically a profile of a still further modification of the wedge shaped airfoil of Fig. 3, in which the surfaces of the leading edge are each convex and the trailing edge is a rounded further modification of the blunt trailing edge of Fig. 3.

Fig. 4 represents a diagrammatic profile of a still further modified form of entering wedge airfoil, in which the upper and lower surfaces are slightly convex, and in which the blunt trailing edge has a rearward emission of projected fluid emerging substantially parallel to and of substantially the same velocity relative to the airfoil as the relative airstream passing about the airfoil and of the thickness of the airfoil.

Fig. 5 represents diagrammatically a plan, partially in transverse section, of a movable airfoil, such as a propeller or rotor blade of varying cross-sectional contours, in which the fluid medium in which the airfoil moves may enter the blade adjacent to its rotary axis, and by centrifugal force be thrown outwardly against rearwardly inclined blades behind a wedge shaped entering edge to exit rearwardly from the peripheral tip to form the synthetic trailing edge of the wedge shaped airfoil tip having a minimized frictional coefficient relative to the airstream flowing relatively about the airfoil, to preclude the attainment of the compressibility burble or other adverse drag effects from the super-sonic velocities of the blade tip.

Figs. 6, 7, 8, 9 and 10 represent respectively transverse diagrammatic profiles through the rotor blade of Fig. 5, showing the various preferred contours, each of which is designed for optimum efficiency at its respective relative operating speed.

Fig. 11 represents a diagrammatic fragmentary elevation of the tip end of the rotor blade of Fig. 5.

Fig. 12 represents a diagrammatic plan view similar to that of Fig. 5, of a modified form of airfoil, having intake suction slot boundary layer flow control apertures in the surface of the airfoil, and, illustratively having at the tip rearwardly directed baffles or deflectors by which the fluid in which the blade moves is flung out by centrifugal force, in the case of use of the airfoil as a rotor or propeller blade.

Fig. 13 represents a diagrammatic chordwise section through the airfoil of Fig. 12.

Fig. 14 represents a diagrammatic fragmentary plan of the tip section of a rotor or propeller of conventional plan form partially broken away and having a rearward gas emission.

Figs. 15, 16 and 17 represent sections through various airfoils in each of which is provided the introduction of a moving stream of fluid into the airfoil and its emission at suitable points to facilitate the smooth laminar flow over the outer surfaces of the airfoils in accordance with the invention.

Fig. 18 represents a fragmentary diagrammatic section through a modified form of airfoil in which the blunt trailing edge is replaced by controllable flaps or closure doors for the emission of fluid under pressure and is operative by suitable linkages or the like, so that the trailing edge may be closed when desired, either manually or automatically.

Fig. 19 represents a similar section with the trailing edge closed and forming the conventional streamlined trailing edge.

Fig. 20 represents a plan of the airfoil of Figs. 18 and 19, showing an illustrative form of linkage for the controlling purpose, in which the axis of flapping of the blade is eccentric to the axis about which a control link swings so that upward tilt of the blade is accompanied by extension of the link or its retraction as desired.

The disclosure of Fig. 1 is purely diagrammatic to illustrate the present day airfoil sections, typical approximately of all types of airfoils having more or less blunt leading edges C, a thick mid section, A—B and an after section D tapering gradually down to a sharp trailing edge, and having generally similar contours whether used for fixed wing purposes, or for the blades of rotors, whether of propellers or rotary wing systems.

Such present day airfoil sections usually have a greater camber in the upper surface A than is present in the lower surface B in order to produce, by means of the greater acceleration of the air flow over the upper surface of the blunt leading edge C the aero-dynamic phenomenon known as "top surface lift." This is brought about through the creation above the airfoil of an area of diminished pressure resulting from the relatively higher velocity of the flow in this region. In the operating ranges of conventional airfoils the air adjacent to the surfaces, known as the "boundary layer" experiences a transition from the laminar form to that of turbulence in the region indicated in general at T in Fig. 1.

Referring to Fig. 3 there is disclosed a wedge-shaped airfoil 9 exemplifying certain phases of the invention according to one portion of the problem. The airfoil shown in diagrammatic elevation is of the sort which we have designated as "entering wedge" and comprises the blunt trailing edge surface 10 which may be considered as of two spaced trailing edges and the upper and lower relatively divergent surfaces 11 and 12 diverging from leading edge to trailing edge, as viewed meeting at the apex as a point or line at 13 and the angular divergence of which is preferably not appreciably greater than 30°. Surfaces 11 and 12 are each shown as slightly concave, but either or both of the surfaces may be planar to form a true wedge in profile as indicated in Fig. 3B, or, as indicated in Figs. 3A and 3C, the surfaces 11 and 12 may be more or less convexed either as independently curved surfaces as in Fig. 3C, or as flattened arcs of circles as shown in Fig. 3A. It is to be understood that for many subsonic, and even higher speed ranges the airfoils of Figs. 3, 3A, 3B, and 3C and 4 have great importance, as the relative air stream meets a mere line at 13 and 17 respectively, and therefore has very little or a greatly reduced stagnation area by which excessive pressural drag is created. The divergence of the surfaces is gradual so that the flow deflection is at a very small angle and the acceleration of the air flowing relatively past the airfoil is held to small limits by the relative absence of stagnation pressure energy and minimal flow deflection. The only undesirable factor of such an airfoil at the sonic velocities is the blunt trailing "edge" 10, which causes a high momentum loss wake following the airfoil and thus a high degree of drag, as will be understood. However this drag in many cases is insufficient to detract from the other highly favorable attributes of the airfoil, especially as regards its freedom from compressibility burble which latter condition, of course, results in a far higher degree of drag. It is to be recognized that the entering wedge airfoil of itself is of great importance, either as a fixed wing, or as the tip section of a rotor or propeller or as the leading edge portion of an airfoil having various types of trailing edges. Thus in Fig. 3 as noted the trailing edge 10 is blunt and practically of the full width of the airfoil. As shown in Fig. 3A the airfoil surfaces 1 and 2 may be flattened arcs meeting at the leading edge in a line 13 and converging upon a thin or line trailing edge 3. In Fig. 3B, the trailing edge comprises the partially convergent surfaces 4 and 5 and the vertical planar portion 6 whereas in Fig. 3C the trailing edge is a rounded surface 7 analogous to the present day conventional bulbous entering or leading edge construction.

The entering wedge airfoil having no appreciable stagnation area, as disclosed in Fig. 3, and the related figures, can be so treated as to form the theoretically substantially ideal airfoil for sonic and super-sonic speeds if the trailing edge drag can be eliminated or sufficiently minimized. The diagrammatic illustration comprising Fig. 4 indicates the solution to the trailing edge drag according to one phase of this invention. Thus an entering wedge airfoil 14 having the upper and lower surfaces respectively 15 and 16, meeting in the entering edge line 17, has the rear blunt trailing edge section 18, which is, however, either open preferably, although not necessarily for the entire thickness of the airfoil, or for such portions of the trailing edge as to enable a jet or plurality or multiplicity of jets of more or less compressed fluid discharge rearwardly, of substantially the same sectional thickness vertically as the rear or physical trailing edge or trailing edges of the airfoil, and having the same high velocity, preferably, relative to the airfoil, as the latter has relative to the airstream adjacent to the rear part of the airfoil. Thus the various degrees of bluntness typified by the several figures may have various sizes of fluid stream. Thus the trailing edges 10 and 18 of Figs. 3 and 4 respectively may have a rearward fluid stream of the full width of and emergent between such trailing edges. The trailing edge portions 4, 5, and 6 of Fig. 3B may have a fluid stream of the width of wall 6, while the rounded trailing edge 7 of Fig. 3C and the tapering edge 3 of Fig. 3A may have comparatively narrow streams of rearwardly projected high velocity fluid emission.

The jet or gaseous discharge preferably is led suitably into the airfoil, as by ducts, passages, channels, and the like as 19 from any desired source of power (centrifugal energy, in the case of rotors or propellers) or any other gaseous or other fluid pressure and is then guided outwardly in a rearward stream as at 20, which is projected rearwardly with such velocity (due to its pressure) as to merge without appreciable relative movement with the upper and lower airstreams respectively 21 and 22, as at 23. It will be clear that such rearwardly propelled thick stream of fluid under pressure will in effect create a synthetic chordwise extension of the airfoil to form an effective trailing edge having a small frictional coefficient relative to the airstream flowing over the airfoil, so that an ideal situation of no viscous or frictional drag, or of inappreciable drag will be presented. It is further to be understood that in the preferred embodiment the jet or other gaseous emission will not be such as to have a thrust effect, as it is desired that there be no appreciable relative movement between the airstream and the emitted air and therefore the "jet" emission is normally to be distinguished from "jet propulsion."

In the broadest aspects of the invention it is to be understood that the combination of entering wedge airfoil and synthetic frictionless airfoil trailing edge, while the theoretical ideal, does not need to be used as such a combination under certain conditions. It has been mentioned that the entering wedge airfoil may be used with any type of trailing edge, varying from the blunt large end trailing edge to the convergent line trailing edge, as shown respectively in the Figs. 3, 4, 3A, 3B and 3C. It is to be understood that the jet or other gaseous low pressure high velocity flow at the trailing edge as a means of minimizing drag may be used with a conventional or other bulbous-nosed airfoil section. It is further to be contemplated that the rearward gaseous projection, although as noted being preferably of the same relative velocity as the passing airstream to minimize drag, if desired under certain conditions, may be used at a higher velocity such as to combine with the creation of the synthetic trailing edge or the like, of small drag, the jet propulsion of the airfoil in accordance with the aims of certain experimenters seeking to obviate the torque reaction otherwise attaching to the power driving of single rotors or the like. The entering wedge associated with such jet propulsion makes for a highly efficient type of rotor, especially when the projected stream is of the same thickness as the airfoil which is a further departure from early experimenters, so far as known.

Although the entering wedge type of airfoil thus described is of great interest for the several types of airfoil uses, including fixed wings, it finds an immediate use of high utility in connection with rotors and propellers, owing to the ease with which the tip ends thereof attain sub-sonic, sonic and super-sonic speeds, necessitating heavy and expensive reduction gears in combination with larger diameter heavier propellers and rotors and the like to obviate such excessive tip speeds while maintaining propeller or rotor efficiency.

For this purpose reference may be made to the disclosure of Fig. 5 and its related figures. This figure illustrates a blade of a rotatable type, either of a rotor or propeller 24 having a spar or shank 25 arranged for mounting in a hub (not shown), with which it rotates about an axis normal to the shank 25. As shown in the progressive Figures 6, 7, 8, 9, and 10, the blade contour of the rotor changes progressively from the root to the tip from a conventional bulbous airfoil having a rounded entering edge at 26, and the conventional acute trailing edge 27, through thinner and thinner sections, of decreasing bulbosity, until at the tip the entering edge has changed from the bulbous at 26, to the line 28 of the wedge shaped tip end 30, and the trailing edge has changed from the conventional convergent to the blunt enlarged trailing edge 31 having the elongated oval shaped aperture 32 of Fig. 11 containing a plurality of angular baffles 33 so shaped and proportioned as to divert the course of air moving spanwise through the blade, to direct a rearward stream of air under low pressure and high velocity at the blunt trailing edge of the tip as indicated by the arrows. While the fluid pressure may be derived from any desired extraneous source it is an important part of this invention to utilize the centrifugal force available from the rotational energy of the rotor or propeller itself by providing longitudinal passages through the blade leading to the baffles 33, from suitable openings into the blade closer to or in the hub thereof. Illustratively in Fig. 5 a series of elongated longitudinal slots 34 close to the hub of the rotor are provided through which air can enter to satisfy the pressure differential created by the centrifugal force acting upon the air in the rotor blade as it is flung outwardly through the openings between the baffles 33. It will be evident that with knowledge of the tip speed to be attained by the rotor or propeller blade, the area of tip to be treated for super-sonic conditions will be evident, and the pressure to be developed and volume of the airflow to be flung out will be subject to variation by the size and location of the inlet apertures 34 and their spaced relation from the discharge jets 32 as well as the rotational speed of the blade. It is preferred and the rotor is so designed as to have the air volume and velocity such as to permit super-sonic motion of the blade tip without any of the adverse factors attaching to the use of the conventional airfoils at such speeds. The advantages from the rotor and propeller standpoints, with the ability to utilize small diameters operating at high rotational speeds and to obviate the weight of the larger diameters with their attendant reduction gears to drive the propellers or rotors at engine speed or higher, will be obvious.

While there are many modifications of the rotor or propeller blade assembly that may be resorted to, as will be obvious, mention may be made of a few that incorporate additional principles. In the modification of Fig. 12, the blade 35 having the tip end provided with the rearwardly disposed jets from the baffles or other directing means 36, has the inlets 37 for the air to be centrifugally inducted arranged in a series of apertures at any desired points in the surfaces of the blade, and illustratively in points of the surfaces such as to act as flow control suction slots for removal of the turbulent boundary layers extending over the inboard airfoil surfaces. Thus, as shown in Figs. 12 and 13 slots 37 are provided in the upper surface 38, while additional inlets a little further forward communicating with a duct separate from that leading to the upper surface due to the relative pressure differentials may be provided in the lower surface 40 and 41. These dispositions are of course purely illustrative and the location of the slots at other points to secure desired results may equally well be resorted to.

In Fig. 14 a similar rearward surface for a normal plan form airfoil blade is shown at 45 in which the section is not acute. It has been shown that the modification of the nose with its stagnation areas by providing the wedge shaped entering edge marks a great advance in efficiency for high speed flight in the super-sonic range. There are other ways of accomplishing analogous results.

The advantages of the several forms of composite airfoil shown in Figs. 15, 16 and 17, which include the provision of the exit gap of substantial or effective wing slots, may be summarized as follows: As the air acquires high velocity in flowing through the slot exit gaps due to the nozzle or slot confinement effect, an unbroken flow over the surfaces of the main wing is thus maintained which materially assists in improving the high speed characteristics of the composite airfoil.

In Fig. 15 a composite airfoil is disclosed in which a forward main airfoil entering edge element 97 has an open wide trailing edge airfoil portion 101, of smaller profile thickness than the forward part 97, having an entering edge portion 102 within the spaced trailing edges 98 and 100. A suitable source of air pressure 103 is provided by means of which air at high velocity, equaling that flowing over the trailing edges 98 and 100, flows out through the slots 104 and 105 to establish and maintain laminar flow over the rear airfoil section and to preclude any appreciable viscous drag building up over the after part of the composite airfoil.

In Fig. 16 a further modified form of airfoil is disclosed formed by taking the entire airfoil of Fig. 15, and adding to it a substantially wedge shaped entering edge portion 106 forming slots 107 and 108 relative to the entering edge of the secondary airfoil element 110. The latter has the rear spaced trailing edge lips 111 and 112 defining slots 113 and 114 relative to the rearwardly convergent trailing edge portion 115. A source of air pressure or the like 116 furnishes power to cause smooth laminar flow over portion 110, and an analogous source of pressure and power 117 functions relative to the slots 113 and 114, as has been described of the slots 104 and 105 in Fig. 15.

A similar composite airfoil is disclosed in Fig. 17, combining the wedge shaped entering edge portion 119, the flared rear edges of which form slots 118 and 120 relative to the open front of the main airfoil element 121. Sources of energy in either or both of the confronting portion will cause such jet or slot emission as to secure boundary layer control. Diagrammatic power source 122 is shown in the entering edge portion.

It will be clear to those skilled in the art that with certain rotors, the effect of the compressibility burble may vary between blades of the rotor, owing to the fact that the blade moving against the air stream has much greater relative velocity than that which is moving with the airstream. It is desirable that the relative changes in speed should not upset the smooth operation of the invention as it affects the tip constructions. As the relative direction of the blade, whether into or with the airstream in the ordinary flapping rotor is accompanied by changes in blade angle about the flapping axis or relative change of blade incidence a simple solution to the problem of differential rotor speeds is secured by the device shown in Figs. 18, 19 and 20. A blade 125 having slots or the like in accordance with the earlier discussion admitting air to the interior of the blade has a tip end comprised of movable or bendable surfaces respectively 126 and 127. A link 128 pivoted to surface 126, is pivoted also to the link 130 which is pivoted to the surface 127. A bell crank lever has one arm 131 pivoted to the common center of the two links, and the other arm engages a link 132 extended beyond the end of the blade toward the hub to a transverse pivot 133 eccentric to the pivot 134 upon which the blade is flappingly pivoted. Obviously as the blade rises and falls the link 132 is moved outwardly and inwardly, actuating the bell crank to exert force upon the links 128 and 140 like a toggle, to open the trailing edge to permit the rearward emission of the air flung centrifugally or otherwise from the blade, or to close the trailing edge to preclude the emission of such air as shown in Fig. 19. Application of similar provisions for other types of rotors will be obvious.

We claim as our invention:

An airfoil for rotor use comprising a blade the tip end region only of which has a wedge-shaped entering edge and an open trailing edge, intake means on the blade spaced hubwardly from the tip, and the whole so arranged that air is drawn into the intake and centrifugally flung outwardly and rearwardly of the tip end only to minimize drag at critical compressibility speeds attained by said tip, means controlling the open trailing edge and responsive to blade movement to regulate the said open trailing edge.

CHARLES TOWNSEND LUDINGTON.
ROGER W. GRISWOLD, II.